United States Patent
Landers, Jr. et al.

(10) Patent No.: US 10,129,507 B2
(45) Date of Patent: Nov. 13, 2018

(54) SYSTEM AND METHOD FOR SELF-CHECKOUT USING PRODUCT IMAGES

(71) Applicant: Toshiba Global Commerce Solutions Holdings Corporation, Tokyo (JP)

(72) Inventors: John David Landers, Jr., Raleigh, NC (US); David John Steiner, Raleigh, NC (US); Phuc Do, Morrisville, NC (US)

(73) Assignee: Toshiba Global Commerce Solutions Holdings Corporation, Tokyo (JP)

(*) Notice: Subject to any disclaimer, the term of this patent is extended or adjusted under 35 U.S.C. 154(b) by 69 days.

(21) Appl. No.: 14/331,565

(22) Filed: Jul. 15, 2014

(65) Prior Publication Data
US 2016/0019514 A1   Jan. 21, 2016

(51) Int. Cl.
  G06Q 20/00 (2012.01)
  H04N 7/18 (2006.01)
  G06Q 20/20 (2012.01)
  G06K 9/00 (2006.01)
  G07G 1/00 (2006.01)

(52) U.S. Cl.
  CPC ......... H04N 7/181 (2013.01); G06K 9/00288 (2013.01); G06K 9/00771 (2013.01); G06Q 20/201 (2013.01); G06Q 20/202 (2013.01); G07G 1/0045 (2013.01)

(58) Field of Classification Search
None
See application file for complete search history.

(56) References Cited

U.S. PATENT DOCUMENTS

| | | |
|---|---|---|
| 5,497,314 A | 3/1996 | Novak |
| 6,296,186 B1 | 10/2001 | Spencer et al. |
| 7,168,618 B2 | 1/2007 | Schwartz |
| 7,389,918 B2 | 6/2008 | Wike, Jr. et al. |

(Continued)

FOREIGN PATENT DOCUMENTS

| | | |
|---|---|---|
| WO | 2009027835 A1 | 3/2009 |
| WO | 2009091353 A1 | 7/2009 |
| WO | 2013134865 A1 | 9/2013 |

OTHER PUBLICATIONS

Zhai, Y. et al., "Composite Spatio-Temporal Event Detection in Multi-Camera Surveillance Networks", Workshop on Multi-camera and Multi-modal Sensor Fusion Algorithms and Applications, Oct. 1-5, 2008, pp. 1-12, Marseille, France.

(Continued)

Primary Examiner — Ramsey Refai
(74) Attorney, Agent, or Firm — Coats & Bennett, PLLC

(57) ABSTRACT

A network of cameras is disposed throughout a store, such as a grocery store, for example. The cameras are positioned so as to monitor the products available in the store, as well as the entrances and exits to and from the store. Customers are identified as they enter the store, and their movements throughout the store are tracked. The cameras capture images of the products selected by the customer and then send those images to a computer server. The server identifies each product selected by the customer, maintains a total price for all products selected by the customer, and automatically debits the customer's account for the total price upon detecting the customer leaving the store.

19 Claims, 7 Drawing Sheets

(56) References Cited

U.S. PATENT DOCUMENTS

| | | | |
|---|---|---|---|
| 7,516,888 B1* | 4/2009 | Kundu | G06Q 20/00 235/375 |
| 7,631,808 B2* | 12/2009 | Kundu | G06Q 20/00 235/375 |
| 7,845,554 B2 | 12/2010 | Jacobs | |
| 7,909,248 B1 | 3/2011 | Goncalves | |
| 8,126,195 B2 | 2/2012 | Landers, Jr. et al. | |
| 8,132,725 B2* | 3/2012 | Kundu | G06Q 20/00 235/375 |
| 8,320,633 B2 | 11/2012 | Ross et al. | |
| 8,430,311 B2 | 4/2013 | Ostrowski et al. | |
| 8,448,858 B1* | 5/2013 | Kundu | G07F 17/3241 235/375 |
| 8,474,715 B2 | 7/2013 | Goncalves | |
| 8,494,909 B2 | 7/2013 | Goncalves | |
| 8,498,903 B2 | 7/2013 | Edwards | |
| 8,560,357 B2* | 10/2013 | Sickenius | G06Q 30/02 705/14.58 |
| 8,571,298 B2* | 10/2013 | McQueen | G06K 9/00 235/378 |
| 9,177,224 B1* | 11/2015 | Heller | G06K 9/52 |
| 9,424,601 B2* | 8/2016 | Brosnan | G01G 19/4144 |
| 9,892,438 B1* | 2/2018 | Kundu | G06Q 30/0609 |
| 2002/0138374 A1* | 9/2002 | Jennings | G06K 9/00 705/29 |
| 2002/0187774 A1* | 12/2002 | Ritter | G06Q 30/06 455/414.1 |
| 2006/0032915 A1* | 2/2006 | Schwartz | G06Q 20/208 235/383 |
| 2007/0262149 A1* | 11/2007 | Knowles | G06K 7/10693 235/462.01 |
| 2009/0039164 A1 | 2/2009 | Herwig et al. | |
| 2009/0160975 A1 | 6/2009 | Kwan | |
| 2010/0002902 A1 | 1/2010 | Landers, Jr. et al. | |
| 2011/0227924 A1 | 9/2011 | Nakajima et al. | |
| 2012/0127314 A1 | 5/2012 | Clements | |
| 2012/0158482 A1* | 6/2012 | Paradise | G06Q 30/0224 705/14.25 |
| 2013/0048722 A1* | 2/2013 | Davis | G06K 7/10861 235/383 |
| 2013/0058539 A1* | 3/2013 | Mori | G06T 7/62 382/106 |
| 2013/0230239 A1 | 9/2013 | Feris et al. | |
| 2013/0278760 A1 | 10/2013 | Beams et al. | |
| 2013/0284806 A1 | 10/2013 | Margalit | |
| 2015/0012396 A1 | 1/2015 | Puerini et al. | |
| 2015/0019391 A1 | 1/2015 | Kumar et al. | |
| 2015/0029339 A1* | 1/2015 | Kobres | H04N 7/181 348/150 |

OTHER PUBLICATIONS

Gangopadhyay, A., "An image-based system for electronic retailing", Decision Support Systems, 2001, pp. 107-116, vol. 32, Elsevier.

* cited by examiner

SYSTEM AND METHOD FOR SELF-CHECKOUT USING PRODUCT IMAGES

FIELD OF THE INVENTION

The present application relates generally to computing systems configured for Point of Commerce (POC) applications, and more particularly to computing systems configured for automatically debiting a customer for products selected by the customer as the customer moves through a store.

BACKGROUND

A Point of Commerce (POC) may broadly refer to shopping or retail transactions conducted within a "brick and mortar" retail store or at any location by use of a computing device that is suitably connected to a communications network. Conventionally, a customer shops within a store and proceeds to a "full-service" checkout station in which a store employee scans each selected product. When scanning is complete, the customer pays for the products. Alternatively, the customer may proceed through a "self-service" checkout station in which the customer, rather than the store employee, actively scans the selected products. Regardless of whether the customer proceeds through a full-service checkout station or a self-service checkout station, however, the scanner at the checkout station identifies the selected products using a bar code that is attached to, or printed on, the selected product. Information associated with the particular barcode, which is typically stored at a centralized server, is then used by the checkout station to calculate and display the amount owed by the customer for the selected products.

SUMMARY

The present disclosure provides a system, device, and corresponding methods for checking out customers from a store. In one or more embodiments, the store is equipped with a network of cameras connected to a computer server. The cameras are positioned to cover all areas of the store, but particularly focus on the entrances and exits to and from the store, as well as the shelving and other areas of the store that display the products for purchase by the customers. The products for sale by the store are positioned in predetermined areas of the store that are known to the server.

When a customer enters the store, the system identifies the customer. The system also tracks the customer's movements through the store, detects when the customer places a product from the shelving into a cart, and identifies the selected product. Identification of the selected product is based on an analysis of an image of the product captured by a camera trained on the particular section of shelving on which the product was displayed. The system keeps track of the products that are selected by the customer and automatically debits the customer's account for the price of the products when the customer leaves the store.

Of course, those skilled in the art will appreciate that the present invention is not limited to the above contexts or examples, and will recognize additional features and advantages upon reading the following detailed description and upon viewing the accompanying drawings.

DETAILED DESCRIPTION

The present disclosure provides a system, a computing device, and corresponding methods for automatically checking out customers from a store. More particularly, the store has a network of video cameras communicatively connected to one or more computer servers. Each product in the store is displayed in a predetermined location on a predetermined shelf or storage area. Further, each camera is positioned such that it focuses only on a subset of all products offered by the store. Thus, each camera is positioned to focus on a different predetermined section of the shelving in the store; however, some overlap between cameras may occur. In some embodiments, there may be multiple cameras focused on the same subset of products; however, in such cases, the different cameras are focused on the same subset of products from different angles.

As customers enter the store, they are identified by the server and tracked as they move throughout the store. When the customer selects a product from a shelf and places the product into his or her cart or basket, the camera or cameras positioned to focus on that product capture images of the selected product. The images are then sent to the server, which analyzes the captured images using image analysis technique known in the art. Based on that image analysis, the server identifies the selected products and dynamically updates a total price for all products selected by the customer. Upon detecting that the customer is leaving the store with the selected products, the server automatically charges or debits an account associated with the customer for the calculated total price.

Figure 1:
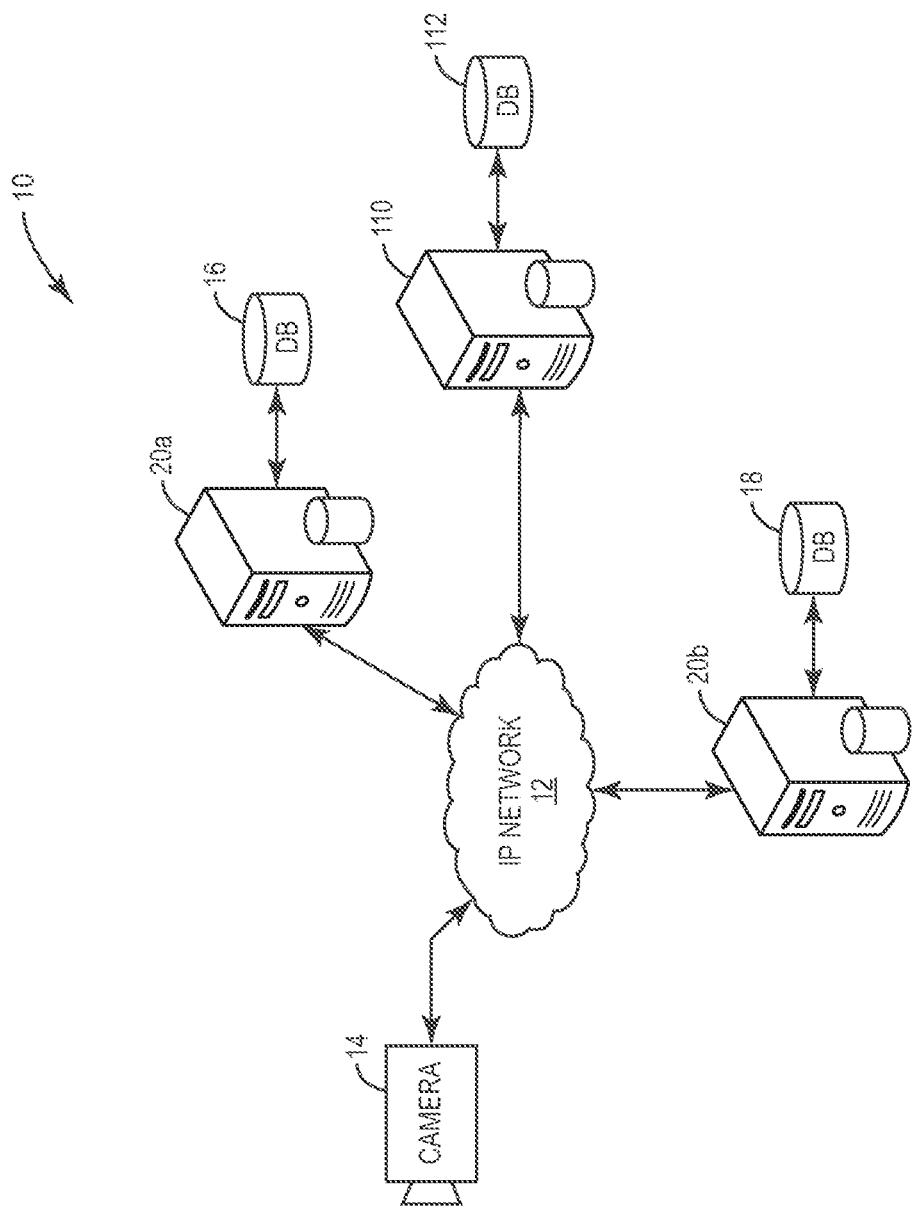
FIG. 1 is a functional block diagram illustrating some entities of a system for checking out customers from a store according to one embodiment of the present disclosure.

Turning now to the figures, FIG. 1 is a block diagram illustrating a communications system 10 configured according to one embodiment of the present disclosure. It should be noted that the components of system 10 are discussed herein as if those components were associated with, and located in, a single store. However, this is for illustrative purposes only. Those of ordinary skill in the art will readily appreciate that in some embodiments, only some of the components seen in FIG. 1 are disposed in the store, while other components are located remotely from the store.

As seen in FIG. 1, system 10 comprises an IP data network 12 that communicatively interconnects a plurality of video cameras 14 disposed throughout a store to one or more computer servers 20a, 20b (collectively referred to herein as computer server 20). The servers 20 are further connected, in at least one embodiment, to a master server 110 connected to a master database (DB) 112. The cameras 14 may comprise any camera known in the art that is capable of capturing video imagery and/or still images, and then communicating those captured images to one or more of the computer servers 20. Similarly, the IP network 12 may comprise any private or public data network known in the art, such as the Internet, for example, but is capable of communicating packets of data utilizing the well-known Internet Protocol (IP). Such data includes, as described in more detail below, image data captured by one or more cameras 14, as well as commands, signals, and data required for the computer servers 20 to control cameras 14 and perform its functions.

Each computer server 20a, 20b, as described in more detail below, may communicatively connect to, or comprise, one or more databases (DBs) 16, 18. One or both of the DBs 16, 18 are configured to store image data associated with the products offered for sale by the store. Such data includes, but is not limited to, data used for image analysis, pricing data, sale data, as well as an indicator or other identifier that uniquely identifies the specific location of the products within the store. When the computer servers 20 receive the images of the products captured by cameras 14 via IP network 12, computer servers 20 can utilize the image data stored in the DBs 16, 18 to analyze the received images. Based on that image analysis, the computer servers 20 identify and process the selected product for purchase by the customer.

The master server 110 and/or the master DB 112 may or may not be co-located with the servers 20. Regardless of the location, however, the master DB 112 comprises a computer-readable media that stores product information for each product in the store. In one embodiment, which is described in more detail later, the servers 20a, 20b may communicate with the master server 110 to identify a given product based on information stored in the master DB 112 in cases where the servers 20 are unable to satisfactorily identify the product.

Figure 2:
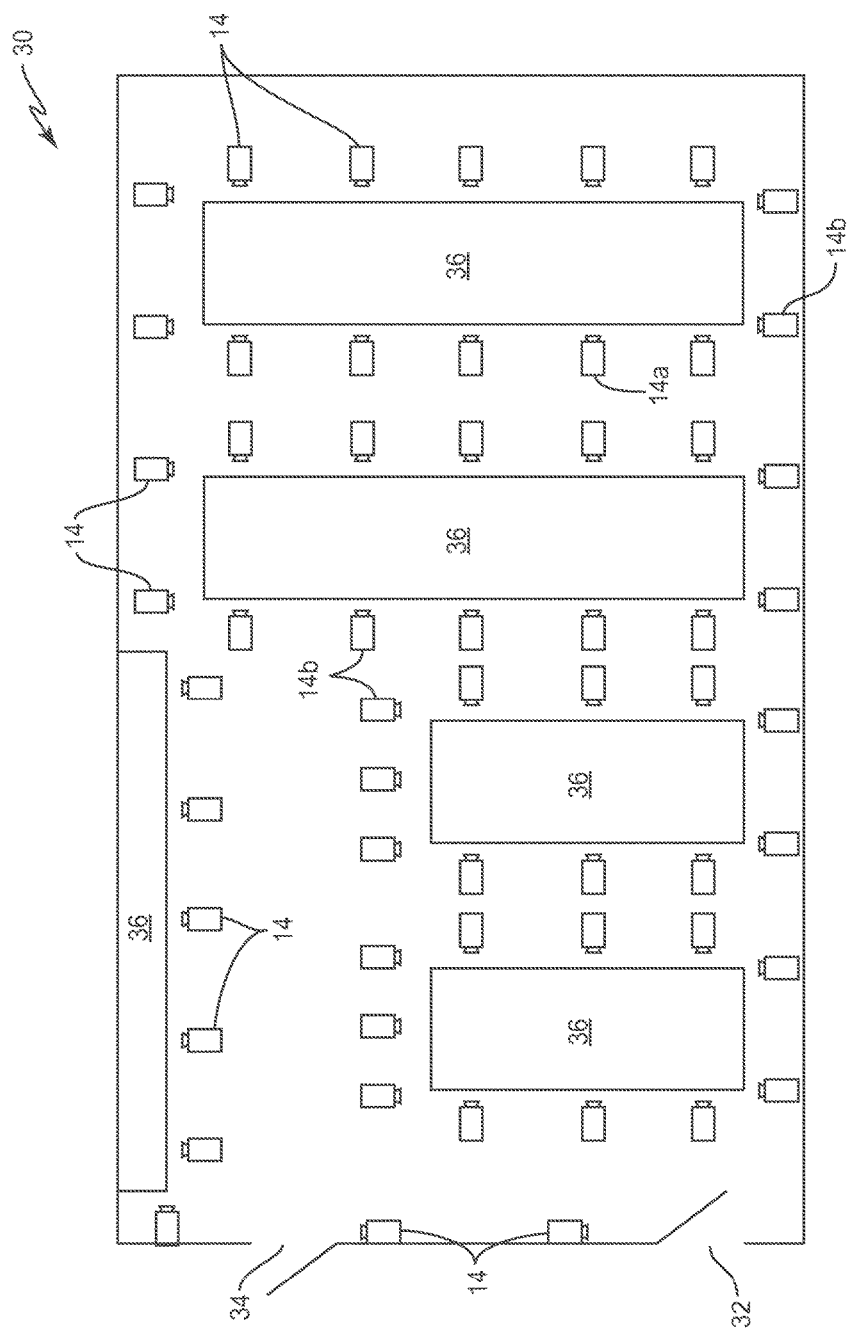
FIG. 2 is a block diagram illustrating a network of cameras positioned throughout the store according to one embodiment of the present disclosure.

FIG. 2 is a block diagram representing a layout of a store 30 that offers a plurality of different products for sale to a customer. As seen in FIG. 2, the store 30 comprises an entrance 32 through which customers enter the store 30 to purchase goods, and an exit 34 through which the customers exit the store 30 with their purchased goods. The store 30 also comprises a plurality of shelves 36 disposed across the floor space of the store 30. In accordance with the present disclosure, the products available for sale to the customers are displayed on predetermined sections of the shelves 36. The locations of the shelves 36 (and other storage areas), the predetermined sections of the shelves 36, and the particular products that are displayed in each predetermined section, are known to the server 20 in advance. That is, the computer servers 20, as well as their corresponding DBs 16, 18, are pre-provisioned with this information.

It should be understood that in the context of this disclosure, shelves 36 are intended to represent any structure that is used by the store owner or operator to display merchandise and products for sale to customers. Such structures include, but are not limited to, shelving, bins, baskets, towers, end caps, panels, racks, and the like.

Also seen in FIG. 2 is the plurality of video cameras 14 that are disposed throughout the store 30. In this embodiment, each of the cameras 14 is positioned such that it is trained on a particular predetermined area of the store. For example, some of the cameras 14 are positioned to detect when a customer enters or exits the store through entrance 32 or exit 34, while other cameras 14 are positioned to focus only on a particular section of shelving 36. As stated previously, each product offered by the store is assigned to a predetermined section of a shelf 36 or other storage area. These locations are mapped and stored in a storage medium accessible to the computer servers 20. Whenever a customer takes a product from its predetermined section on a shelf 36 and places the product in a cart, the camera 14 assigned to that particular section of shelf 36 captures an image of the selected product. This captured image is then sent to one or more of the computer servers 20 where it is identified based on an image analysis performed on the captured image.

In some embodiments, more than one camera 14 may be positioned such that each is trained or focused on the same predetermined area or section of a shelf 36 in store 30. However, in these cases, each of the one or more cameras 14 would be positioned so as to focus on the product or subset of products displayed in that particular section of shelf 36 from a different angle. For example, as seen in FIG. 2, a first camera 14a may be positioned such that it can monitor a subset of products on a shelf 36 from a first angle (e.g., from the front and above the subset of products on shelf 36), while a second camera 14b is positioned on an end of shelf 36 so as to monitor the same subset of products from a second angle (e.g., from the side and above the subset of products on shelf 36). When the customer takes a product from this particular section of shelf 36 and places the product in the cart, both cameras 14a, 14b capture an image of the product from a corresponding different angle, and send their respective images to one or more of the computer servers 20. The two images captured from different angles could allow the computer servers 20 to generate at least a 2-dimensional image of the selected product, which it can then utilize for analysis and identification of the selected product.

Images taken from multiple different angles and used in the image analysis, as previously described, can increase the confidence level with which a given product is identified by computer servers 20. However, those of ordinary skill in the art will appreciate that such 2-dimensional imagery and analysis is neither needed nor required for the embodiments of the present disclosure. In some embodiments, for example, three or more cameras 14 may be trained or focused on the same product or subset of products from correspondingly different angles. In such cases, the captured images from these cameras 14 could allow the computer servers 20 to generate a 3-dimensional image of the selected product and analyze that 3-D image. In other embodiments, however, the computer servers 20 may only receive a single captured image of a selected product from shelf 36. Thus, computer servers 20 would only be able to utilize a 1-dimensional image of the product for the analysis. Regardless of the number of images that are captured by cameras 14, however, computer servers 20 identify selected products based on an analysis of the image or images of the selected products rather than on information or data gleaned from an optical a scan of a barcode or similar identifying code printed on the selected products.

Figure 3:
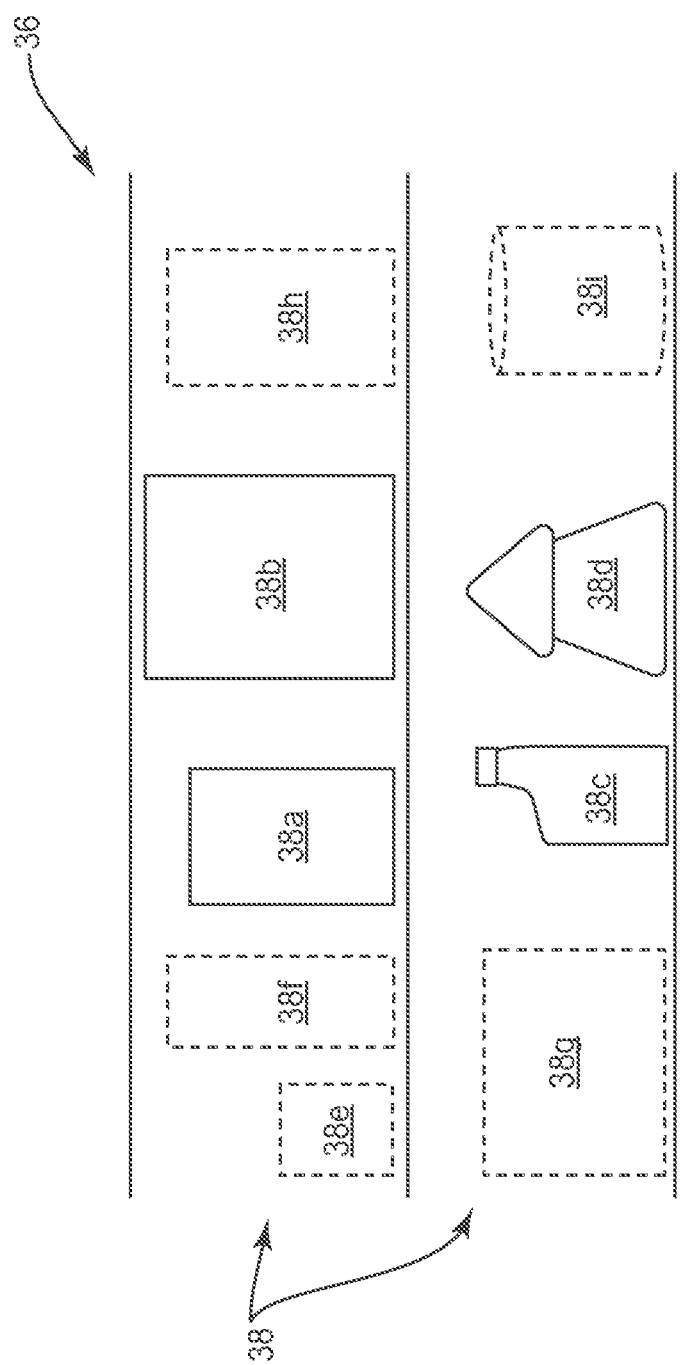
FIG. 3 is a block diagram illustrating a subset of products on a particular section of a shelf monitored by one or more cameras according to one embodiment of the present disclosure.

As previously stated, each camera 14 is positioned so as to be trained or focused on a predetermined section of a shelf 36 in the store 30. Thus, each camera 14 is positioned throughout the store 30 such that only a subset of all products available to a customer is within its field of view. As seen in FIG. 3, for example, one or more cameras 14 are focused on a specific section of a shelf 36 in which a plurality of different products 38a-38i (collectively 38) are displayed. One particular camera 14, however, is focused only on products 38a, 38b, 38c, and 38d.

In addition to being focused on only a subset of products, each camera 14 is also associated with particular ones of the computer servers 20. That is, each computer server 20a, 20b is also provisioned with, or has access to, data regarding each available product 38, as well as with information that uniquely identifies the location of the products 38 in the store 30. However, each computer server 20 is provisioned only with the data and information associated with the subset of products 38 that its associated camera 14 is focused on. This reduces the amount of processing that must be performed by any given computer server 20 to identify a given product. Further, it helps to increase the confidence level with which the computer servers 20 can identify any one of the given products 38.

By way of example only, first camera 14a may be positioned so as to focus on the section of shelf 36 that displays products 38a-38i. Thus, some or all of the products 38a-38i may or may not be within the field of view for camera 14a. However, a first computer server 20 (e.g., computer server 20a) that is associated with camera 14a may only be provisioned with the data and information associated with products 38a-38d. That is, the first computer server 20a may not be provisioned with the data and information associated with any of the other products 38e-38i. Therefore, upon receiving one or more images of any of the products 38a-38d, the first computer server 20a could utilize the data and information to help analyze the received image and identify the selected product as being one of the products 38a, 38b, 38c, or 38d. That same computer server 20a would not, however, be configured with the data and information to process or identify any of the other products 38e-38i on shelf 36. Such processing and identification could, for example, be performed by a second computer server 20b that receives images of those products from camera 14a and/or another different camera 14.

By limiting the number of products for any given computer server 20 is responsible for analyzing, the present disclosure distributes the image analysis processing load, thereby minimizing the amount of data processing that must be performed by the given computer server 20. It also allows the image analysis software executing on the given computer server 20 to perform functions that will only increase the confidence level with which a product is identified.

Particularly, conventional checkout systems store the product information in a centralized database or storage area. Thus, when conventional systems read the information from a bar code of a product, they must typically search through these large amounts of centralized data to determine information about the product (e.g., product ID, price, etc.). Such systems may therefore require complex algorithms and large indices to ensure that the product information is located quickly for presentation to the customer.

With the present disclosure, however, each computer server 20 is configured such that it is only responsible for analyzing the captured image or images of a subset of all available products. The image analysis, which may be performed by the computer servers 20 using any image analysis technique known in the art, may incorporate factors such as the structure, look, color, or shape of a particular product, the logo and/or placement of the logo on a particular product, the name of a product printed on the product, and as stated above, the specific location of a given product on a particular shelf 36. In some embodiments, a combination of two or more of these factors may be employed to identify the product with a greater level of confidence.

Regardless of the factors or number of factors used by the computer servers 20 to identify the selected products, however, the identification and subsequent processing of the selected products for checkout in accordance with the embodiments of the present disclosure is image driven. That is, the computer servers 20 perform an image analysis on the captured image or images of a product selected by a customer, and compare the results of that analysis to the data and information for a predetermined subset of products stored in its associated DB 16 and/or 18. Based on this analysis, the computer servers 20 can identify and process the product selected by the customer for checkout. Further, because each computer server 20 is configured to analyze imagery for only a limited subset of products available at the store 30, rather than for all the products at the store 30, identification and processing of any given product selected by a customer mat be performed without any appreciable delay.

Figure 4A:
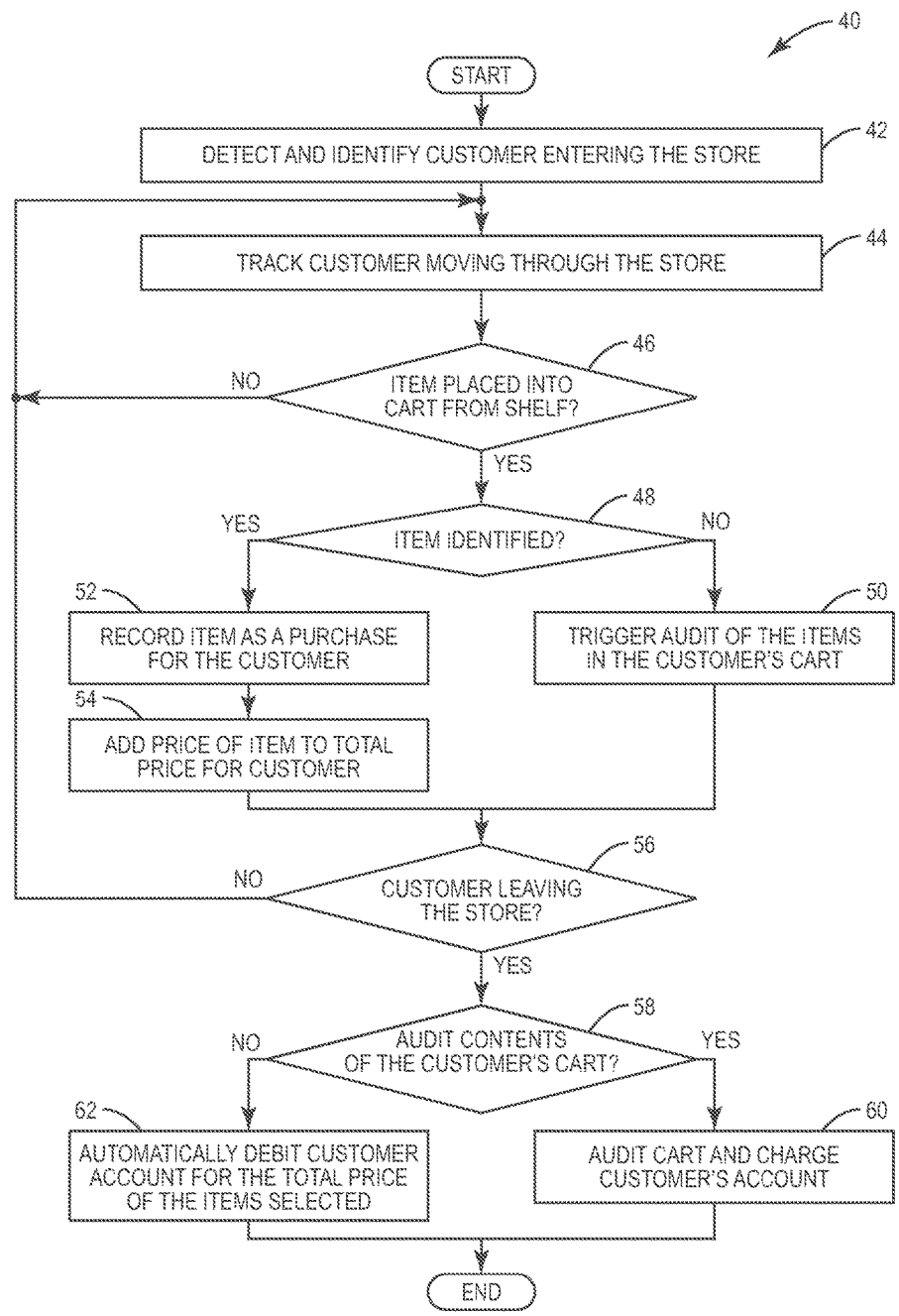
FIG. 4A is a flow diagram illustrating a method for tracking a customer's selection as the customer moves through the store, and for checking out the customer from the store according to one embodiment of the present disclosure.

FIG. 4A is a flow diagram illustrating a method 40 for checking out a customer from store 30 according to one embodiment. Each customer that enters store 30 is uniquely identified by one or more of the computer servers 20 (box 42). For example, a camera 14 may be trained on the entrance 32 to store 30 to capture images of customer faces as they enter the store 30. The images could then be sent to one or more of the computer servers 20, which upon receipt could identify the customers using well-known face-recognition algorithms. So identified, the computer servers 20 could then create a record for each customer that would be used to track each customer's product selections, as well as the customer's location in the store as the customer moves through the store selecting products (box 44).

Those of ordinary skill in the art will readily appreciate that face recognition is not the only method in which the present disclosure is able to identify and track customers as they move through store 30. Other methods include, but are not limited to, identification based on a customer's loyalty card, WiFi detection of the customers' cellular device(s), beaconing, and any other method known in the art. In some embodiments, a combination of such methods may be used to detect a customer entering and moving through the store 30.

As the customer moves through the aisles of store 30 and selects the products from shelves 36, each of the cameras 14 trained on the selected product capture an image of the selected product and send it to the computer server 20 having the customer record (box 46). As previously stated, one or more cameras 14 may be trained or focused on the same product or subset of products on shelf 36, but from different angles. Thus, each of these cameras 14 may capture an image of the selected product from a corresponding different angle and send it to the computer server 20. Upon receipt, the computer server 20 can determine that the customer took a product off of the shelf 36 and placed the product in his/her cart. In one embodiment, a camera 14 may be placed in or on the cart, and positioned so as to capture the image of the product as the customer places the product into his/her cart. Such images can help the server 20 identify the selected product, as well as confirm that the customer took a product off the shelf 36.

Once the computer server 20 has determined that the customer selected a product from shelf 36 and placed the product into the cart, the computer server 20 will image process the received image(s) to identify the selected product, as described above (box 48). If the computer server 20 cannot identify the product, computer server 20 will trigger an audit of the customer's cart (box 50). For example, the computer server 20 may set an audit flag or other indicator in the record created for the customer when the customer entered the store 30.

Additionally, metrics are tracked for the products and the customer as the customer moves throughout the store. By way of example, products and/or the customer may be flagged for audit if a selected product is not recognized by computer server 20, or if a product is selected from a shelf 36 or section of the store 30 in which it does not belong. Further, the computer server 20 may consult one or more predetermined threshold values to determine whether it has recorded the products in the customer's cart with a specified level of confidence. Such thresholds may be based, for example, on observed or suspicious activity of the customer, or a known shopping history of the customer. If any of these thresholds are met, the computer server 20 may trigger an audit of the customer or the products in the cart. In one embodiment, the operators of the store can use the audits to train customers to perform movements that are conducive to identifying selected products. Such movements may be, for example, movements that can speed the checkout process.

If the computer server 20 positively identifies the selected product (box 48), the computer server 20 will record the product for purchase by the customer (box 52) and add the price of the product to a total price calculated for all products selected by the customer for purchase (box 54). As previously described, the identification of the product and determining the details for the selected product (e.g., price), is performed based on an image analysis of the captured image or images of the product. However, in some embodiments of the present disclosure that are described later in more detail, the identification of a given product or products may also utilize barcode information, for example, printed on the product label, or may rely on a master server to identify the product or products.

The customer is tracked by computer server 20 as he/she moves through the store 30 so that computer server 20 can determine whether the customer is leaving the store 30 (box 56). If the customer is not leaving the store, the computer server 20 will continue to track their movements and record the products they select to put into their cart. If computer server 20 determines that the customer is leaving the store 30, however (box 56), the server will begin the automatic checkout process. Particularly, in one embodiment, computer server 20 will determine whether an audit of the contents of the customer's cart is needed (box 58). If so, the computer server 20 will notify a store employee so that the employee can manually perform the checkout process of the customer (box 60). In at least one embodiment, the server 20 that triggered the audit will provide the store employee performing the audit with a picture or pictures of the products in question to help the employee quickly identify whether the customer does or does not have the item in the cart. If the computer server 20 determines that no audit is needed, the computer server 20 automatically debits an account associated with the customer for the total amount (box 62). In this manner, the present disclosure helps to reduce or eliminate the need for a lengthy checkout line.

Figure 4B:
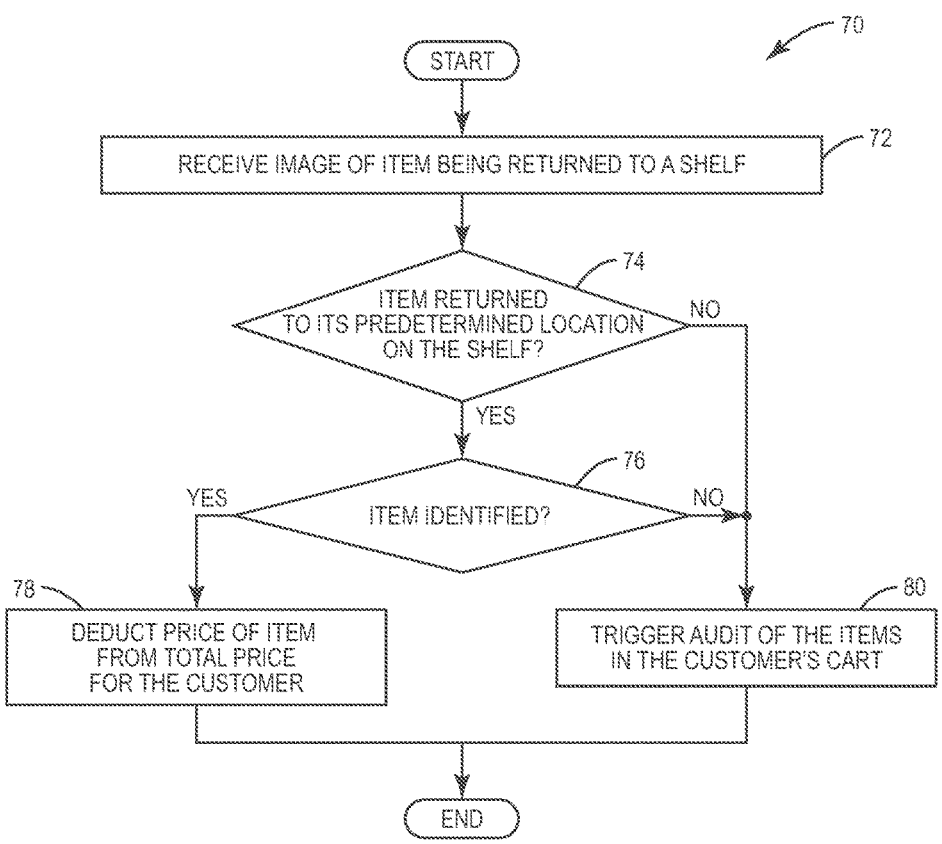
FIG. 4B is a flow chart illustrating a method for dynamically updating a total price for a customer according to one embodiment of the present disclosure.

In some instances, a customer may decide to return a selected product from the cart back to the shelf 36 as they move through the store 30 rather than pay for the product. In these cases, the system 10 is configured to adjust the total price for the customer, and to record the product as being back in its original spot on the shelf 36. FIG. 4B is a flow diagram that illustrates one such method 70 for adjusting the total price for the customer in these situations according to one embodiment.

Method 70 begins when computer server 20 receives one or more images of a product being placed back onto the shelf 36 (box 72). As previously described, one or more of the cameras 14 are configured to capture these images. The computer server 20 connected to the cameras 14 trained on the part of the shelf 36 on which the product is being replaced performs an image analysis on the captured one or more images, and based on that analysis, determines whether the customer is replacing the product back to its original spot on shelf 36, or whether the customer is placing the product back on some random position on shelf 36 (box 74). If the product is being returned to a position on shelf 36 that is not the same as the position from which it was selected, the computer server 20 can trigger an audit of the customer's cart (box 80). Otherwise, the computer server 20 will try to identify the product based on the image analysis (box 76). A positive identification of the product will cause the server 20 to deduct the price of the product being returned from the total price for the customer (box 78). Otherwise, the server 20 will trigger an audit of the customer's cart, as previously described (box 80).

As previously stated, the identification of a given product relies on an analysis of an image of the product captured by one or more cameras. Such identification may occur, for example, regardless of whether a customer is selecting an item from a shelf or returning an item to a shelf. However, at least in some cases, a server performing the image analysis may not be able to recognize the product based on the captured image or may not be able to identify a product beyond a predefined confidence threshold. For example, a customer or some other object may partially screen the product image during image capture, thereby allowing camera(s) to capture an image covering only a portion of the product. In another example, the image analysis software executing on the server 20 may not be able to accurately identify a given product because of the other products that are proximate the selected product. Accordingly, one embodiment of the present disclosure configures the server performing the analysis to also utilize barcode information, or other information, printed on a label of the product to identify the product and/or to boost a confidence level that the product is correctly identified.

Figure 5:
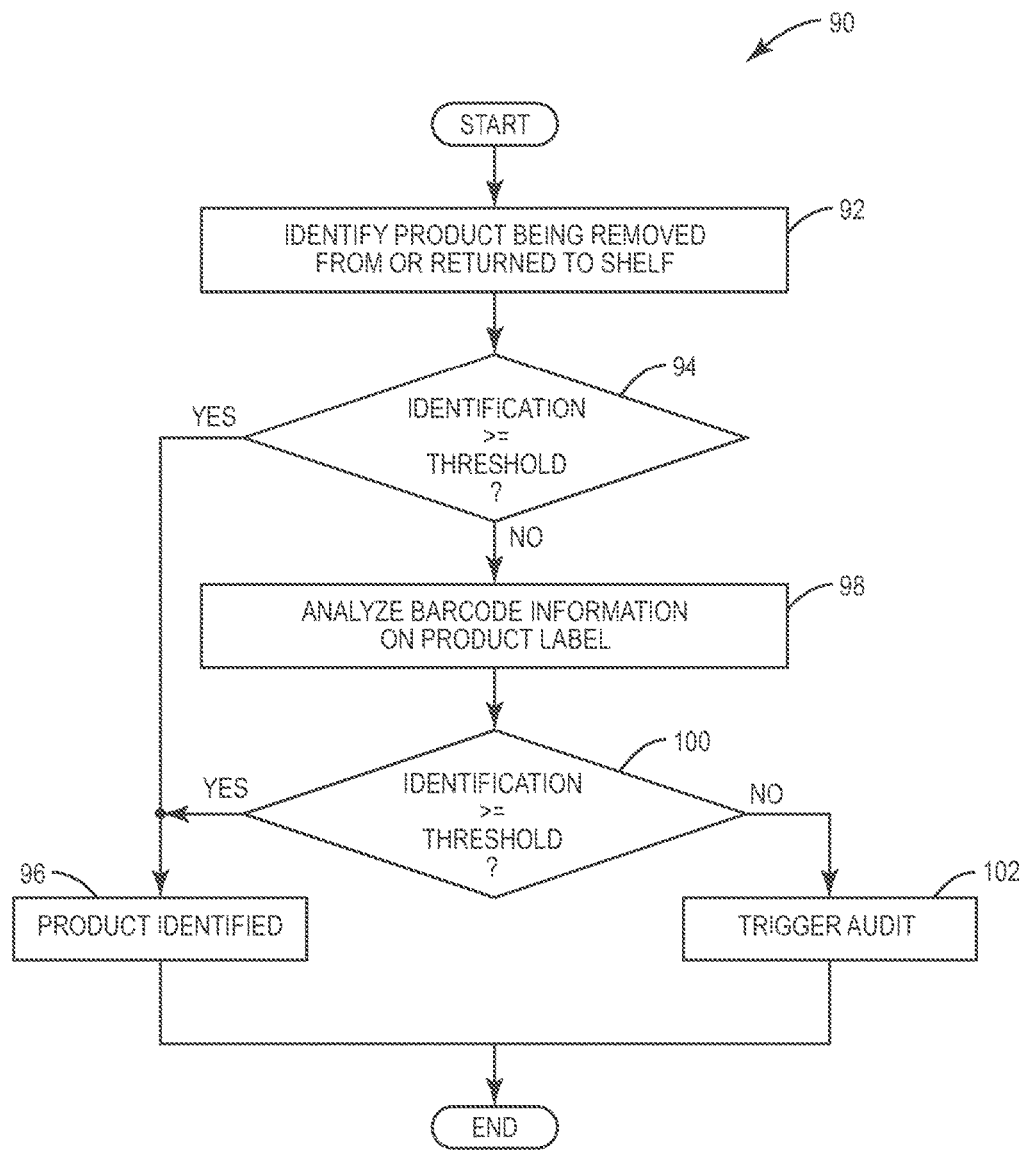
FIG. 5 is a flow diagram illustrating a method for identifying a product in the store according to one embodiment of the present disclosure.

FIG. 5 is a flow diagram illustrating a method 90 for performing an analysis utilizing barcode information, or other information, printed on the product label. Method 90 begins with the server 20 identifying a product that was selected by the customer from a shelf 36, or returned to the shelf 36 by the customer, based on an image of the product received at the server 20 (box 92). As previously stated, this initial attempt at identifying the product may be performed using an image analysis of the product. If the server 20 is able to identify the product from the received image with at least a certain predefined confidence level (e.g., 95%) (box 94), the server 20 considers the product identified (box 96). However, if the server 20 cannot satisfactorily identify the product based on the analysis of the received image (box 94), the server 20 will attempt to analyze barcode information or other information printed on the product label (box 98). Particularly, the image analysis software on the server 20 may analyze the image to determine whether the captured image or images of the product also contains a barcode. If so, the image analysis software can employ well-known algorithms to analyze the barcode and identify the product. The server 20 will then once again determine whether the additional analysis has identified the product to within the predefined threshold (box 100). If so, server 20 considers the product accurately identified (box 98). If not, server 20 may trigger an audit of the customer as previously described (box 102).

In addition to utilizing the barcode information printed on the label, other embodiments may also utilize the master server 110 and its associated database 112 to identify a product. For example, if server 20 is unable to identify a product after performing both an image analysis and a barcode analysis, server 20 may forward the information to master server 20, which has access to information identifying all products in the store. In such cases, the response to identify a certain product may be slightly longer, but it could also help to satisfactorily identify products in cases where server 20 may not be able to accurately identify the product.

Figure 6:
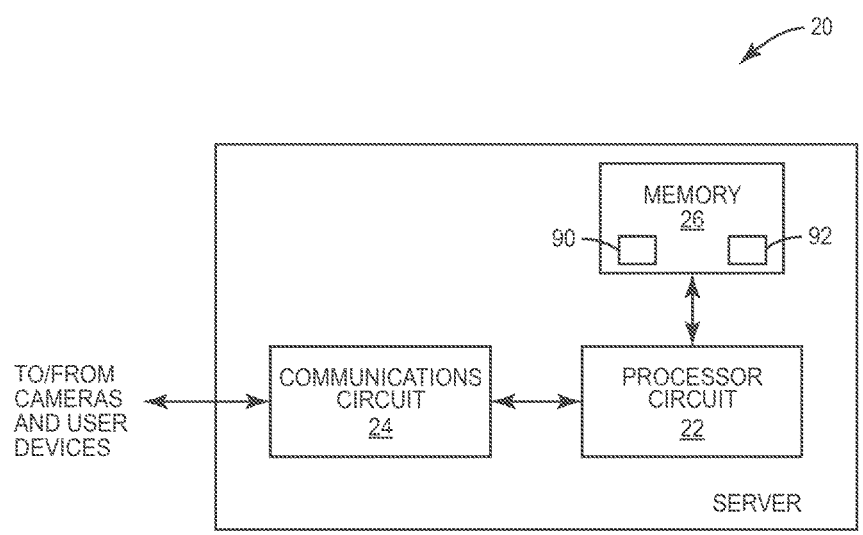
FIG. 6 is a block diagram illustrating some components of a computing device configured according to one embodiment of the present disclosure.

FIG. 6 is a block diagram illustrating some functional component parts of a server 20 according to one embodiment of the present disclosure. As seen in FIG. 6, server 20 comprises a processor circuit 22, a communications interface circuit 24, and a memory circuit 26. The memory circuit 26 is configured to store code and data, such as control application 90 and corresponding image data 92.

The processor circuit 22, which in some embodiments may comprise a plurality of separate processor circuits, may comprise any sequential state machine operative to execute machine instructions stored as machine-readable computer programs in the memory circuit 26, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. The processor circuit 22 is generally configured to control the operations and functions of server 20 according to the data and instructions stored in memory 26. This includes being controlled to perform the previously described functions in accordance with the code and logic that comprises control application 90 and the image data 92.

The communications interface circuit 24 may comprise, for example, an ETHERNET interface or a wireless interface, such as a WiFi interface operating according to any of the 802.XX protocols. Communications interface circuit 24 allows the server 20 to communicate data and messages with remote terminals, such as cameras 14 via IP network 12, using any of a variety of well-known and well-documented protocols, such as UDP and/or TCP/IP, for example. Other communication interfaces not specifically mentioned herein are also possible.

The memory circuit 26 is operatively connected to processor circuit 22, and may comprise any non-transitory machine-readable media known in the art. Such media includes, but is not limited to, SRAM, DRAM, DDRAM, ROM, PROM, EPROM, Flash memory, and the like. In one embodiment, the memory circuit 26 comprises memory that is positioned on the inside of the server 20. In other embodiments, however, it is not. Thus, in at least some embodiments, memory circuit 26 comprises an external database, such as DB 16 and/or DB 18, communicatively connected to the server 20.

The present invention may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method for checking out products from a store, the method implemented by an image processing server and comprising:
    receiving a plurality of images of an product from one or more cameras focused on products positioned on a predetermined section of a shelf in a store responsive to a customer removing the product from the predetermined section of the shelf and placing the product into a cart, wherein each of the one or more cameras is communicatively connected to a corresponding image processing server, and wherein each of the plurality of images of the product is captured from a different angle by different cameras focused on the predetermined section of the shelf;
    generating a multi-dimensional image from the plurality of images of the product being removed from the predetermined section of the shelf by the customer;
    identifying the product removed by the customer based on an image analysis of the generated multi-dimensional image;
    recording the identified product removed by the customer as a purchase made by the customer based on the image analysis;
    determining a predetermined confidence level threshold value based on one or both of a customer activity and a known shopping history for the customer, the predetermined confidence value defining a minimum level of confidence in which products placed in the customer's cart must be accurately identified;
    determining a confidence level value representing a current level of confidence that the product placed in the customer's cart has been accurately identified;
    determining whether the current confidence level value for having accurately identified the product in the customer's cart meets or exceeds the predetermined confidence level threshold value;
    responsive to determining that the current confidence level value does not meet or exceed the predetermined confidence level threshold value:
        analyzing information printed on a label of the product to identify the product; and
        triggering an audit of the customer responsive to determining, based on the analysis, that the product has not been accurately identified to within the predetermined confidence level; and
    automatically debiting an account associated with the user for a price of the product responsive to determining that the current confidence level value meets or exceeds the predetermined confidence level threshold value.

2. The method of claim 1 wherein recording the identified product removed by the customer as a purchase made by the customer comprises:
    determining the price for the product removed by the customer;
    adding the price for the identified product removed by the customer to a total price for all products selected by the customer; and
    sending one or both of the price and the total price to a device associated with the customer.

3. The method of claim 2 further comprising deducting the price of the identified product removed by the customer from the total price responsive to detecting the customer returning the product to the predetermined section of the shelf.

4. The method of claim 2 further comprising triggering an audit of the products removed by the customer responsive to detecting the customer returning the product to an area of the store that is different than the predetermined section of the shelf.

5. The method of claim 1 wherein identifying the product removed by the customer based on an image analysis of the multi-dimensional image comprises identifying the product based on a result of comparing the multi-dimensional image to one or more images of the product stored in a memory circuit.

6. An image processing server for a store, the image processing server having one or more cameras assigned thereto and comprising:
  a communications interface configured to communicate with one or more cameras disposed throughout the store, wherein each of the one or more cameras is focused on a respective predetermined section of a shelf in the store; and
  a processor circuit configured to:
    receive a plurality of images of a product from the one or more cameras focused on products positioned on a first predetermined section of a shelf in the store responsive to detecting that a customer removed the product from the first predetermined section of a shelf in the store and placed the product into a cart, wherein each of the plurality of images of the product is captured from a different angle by different cameras focused on the predetermined section of the shelf;
    generate a multi-dimensional image from the plurality of images of the product being removed from the first predetermined section of the shelf by the customer;
    identify the product removed from the first predetermined section of the shelf in the store by the customer based on an image analysis of the generated multi-dimensional image;
    record the identified product from the first predetermined section of the shelf as a purchase made by the customer based on the image analysis
    determine a predetermined confidence level threshold value based on one or both of a customer activity and a known shopping history for the customer, the predetermined confidence value defining a minimum level of confidence in which products placed in the customer's cart must be accurately recorded;
    determine a confidence level value representing a current level of confidence that the product placed in the customer's cart has been accurately identified;
    determine whether the current confidence level value for having accurately identified the product in the customer's cart meets or exceeds the predetermined confidence level threshold value;
    responsive to determining that the current confidence level value does not meet or exceed the predetermined confidence level threshold value:
      analyze information printed on a label of the product to identify the product; and
      trigger an audit of the customer responsive to determining, based on the analysis, that the product has not been accurately identified to within the predetermined confidence level; and
    automatically debiting an account associated with the user for a price of the product responsive to determining that the current confidence level value meets or exceeds the predetermined confidence level threshold value.

7. The computer server of claim 6 wherein the processor circuit is further configured to:
  determine the price for the product removed by the customer;
  add the price for the identified product to a total price for all products removed by the customer; and
  sending one or both of the price and the total price to a device associated with the customer.

8. The computer server of claim 7 wherein the processor circuit is further configured to deduct the price of the identified product removed by the customer from the total price responsive to detecting the customer returning the product to the first predetermined section of a shelf.

9. The computer server of claim 7 wherein the processor circuit is further configured to trigger an audit of the customer responsive to detecting the customer returning the product to an area of the store that is different than the first predetermined section of a shelf.

10. The computer server of claim 6 further comprising a memory circuit configured to store one or more images of the product, and wherein the processor circuit is further configured to identify the product based on a comparison of the generated multi-dimensional image to one or more images of the product stored in the memory circuit.

11. A method for checking out products from a store having a plurality of cameras and a plurality of image processing servers, the method comprising:
  assigning each camera to at least one image processing server, wherein each camera is focused on a subset of products positioned on a predetermined section of a shelf in the store;
  capturing a plurality of images of a product disposed in a predetermined area of a store responsive to a customer removing the product from the predetermined section of a shelf in the store and placing the product into a cart, wherein each of the plurality of images of the product is captured from a different angle by a different camera focused on the product;
  generating a multi-dimensional image from the plurality of images of the product being removed from the predetermined section of the shelf by the customer;
  identifying the product removed by the customer based on an image analysis of the generated multi-dimensional image;
  recording the product removed by the customer as a purchase of the product by the customer based on the image analysis;
  determining a predetermined confidence level threshold value based on one or both of a customer activity and a known shopping history for the customer, the predetermined confidence value defining a minimum level of confidence in which products placed in the customer's cart must be accurately identified;
  determining a confidence level value representing a current level of confidence that the product placed in the customer's cart has been accurately identified;
  determining whether the current confidence level value for having accurately identified the product in the customer's cart meets or exceeds the predetermined confidence level threshold value;
  responsive to determining that the current confidence level value does not meet or exceed the predetermined confidence level threshold value:
    analyzing information printed on a label of the product to identify the product; and
    triggering an audit of the customer responsive to determining, based on the analysis, that the product has not been accurately identified to within the predetermined confidence level; and automatically debiting an account associated with the user for a price of the product responsive to determining that the current confidence level value meets or exceeds the predetermined confidence level threshold value.

12. The method of claim 11 further comprising:
identifying the customer responsive to the customer entering the store;
tracking the movements of the customer through the store;
determining the price for each product removed by the customer from a predetermined area of the store; and
calculating a total price for all products removed by the customer as the customer moves through the store.

13. The method of claim 12 wherein calculating a total price for all products removed by the customer as the customer moves through the store comprises:
adding the determined price for the product to the total price responsive to a customer removing the product from the predetermined area of the store; and
subtracting the price for the product from the total price responsive to determining that the customer has returned the product to the predetermined area of the store.

14. A checkout system for checking out products from a store, the checkout system comprising:
a plurality of cameras, each camera positioned to focus on a subset of products disposed on a predetermined section of a shelf, and configured to capture a corresponding image of a product disposed in a predetermined section of the shelf responsive to a customer removing the product from the predetermined section of the shelf; and
an image processing server assigned to one or more of the plurality of cameras and configured to:
receive a plurality of images of the product captured by the one or more cameras at different angles responsive to a customer removing the product from the predetermined section of the shelf and placing the product into a cart;
generate a multi-dimensional image from the plurality of images of the product being removed from the predetermined section of the shelf by the customer;
identify the product based on an image analysis of the generated multi-dimensional image;
record the product as a purchase by the customer based on the image analysis;
determine a predetermined confidence level threshold value based on one or both of a customer activity and a known shopping history for the customer, the predetermined confidence value defining a minimum level of confidence in which products placed in the customer's cart must be accurately identified;
determine a confidence level value representing a current level of confidence that the product placed in the customer's cart has been accurately identified;
determine whether the current confidence level value for having accurately identified the product in the customer's cart meets or exceeds the predetermined confidence level threshold value;
responsive to determining that the current confidence level value does not meet or exceed the predetermined confidence level threshold value:
analyze information printed on a label of the product to identify the product; and
trigger an audit of the customer responsive to determining, based on the analysis, that the product has not been accurately identified to within the predetermined confidence level; and
automatically debit an account associated with the user for a price of the product responsive to determining that the current confidence level value meets or exceeds the predetermined confidence level threshold value.

15. The checkout system of claim 14 wherein the server is further configured to:
identify the customer responsive to the customer entering the store;
track the movement of the customer through the store;
determine the price for each product removed by the customer from a predetermined area of the store; and
calculate a total price for all products removed by the customer as the customer moves through the store.

16. The checkout system of claim 15 wherein to calculate a total price for all products removed by the customer as the customer moves through the store, the server is further configured to:
add the determined price for the product to the total price responsive to the customer removing the product from the predetermined area of the store; and
subtract the price for the product from the total price responsive to determining that the customer returned the product to the predetermined area of the store.

17. The method of claim 1 further comprising limiting access by the image processing server to information that is associated with the products positioned on the predetermined area of section of the shelf.

18. The image processing server of claim 6 wherein the processor circuit is further configured to limit access by the image processing server to information that is associated with the products positioned on the predetermined area of section of a shelf (36).

19. The method of claim 11 further comprising limiting access by each image processing server to information that is associated with the corresponding subset of products.

* * * * *